US006978146B1

(12) United States Patent
Yardman

(10) Patent No.: US 6,978,146 B1
(45) Date of Patent: Dec. 20, 2005

(54) DEVICE FOR BLOCKING CELLULAR PHONE SIGNALS

(76) Inventor: Joseph Yardman, 2737 Indiana W.E., Albuquerque, NM (US) 87110

( * ) Notice: Subject to any disclaimer, the term of this patent is extended or adjusted under 35 U.S.C. 154(b) by 155 days.

(21) Appl. No.: 10/718,026

(22) Filed: Nov. 21, 2003

(51) Int. Cl.[7] ................................................ H04Q 7/20
(52) U.S. Cl. .............................. 455/456.4; 455/456.1; 455/575.1; 340/686.6; 340/686.1
(58) Field of Search .......................... 455/456.4, 456.1, 455/575.1; 340/686.6, 686.1

(56) References Cited

U.S. PATENT DOCUMENTS

| | | | | |
|---|---|---|---|---|
| 4,103,236 | A | 7/1978 | Deserno et al. | |
| 5,442,805 | A * | 8/1995 | Sagers et al. | 455/456.5 |
| 6,393,254 | B1 | 5/2002 | Pousada Carballo et al. | |
| 6,456,822 | B1 | 9/2002 | Gofman et al. | |
| 6,496,703 | B1 | 12/2002 | da Silva | |
| 6,765,492 | B2 * | 7/2004 | Harris | 340/686.6 |
| 6,832,093 | B1 * | 12/2004 | Ranta | 455/456.4 |
| 2002/0016180 | A1 | 2/2002 | Derosier et al. | |
| 2002/0102968 | A1 * | 8/2002 | Arend et al. | 455/414 |
| 2002/0107032 | A1 * | 8/2002 | Agness et al. | 455/456 |
| 2003/0017821 | A1 * | 1/2003 | Irvin | 455/410 |
| 2003/0109246 | A1 * | 6/2003 | Shimizu et al. | 455/411 |

OTHER PUBLICATIONS

US 2002/0063651 A1, 05/2002, Murphy et al. (withdrawn)

* cited by examiner

*Primary Examiner*—Danh Cong Le

(57) ABSTRACT

A device for blocking cellular phone signals includes a housing having a substantially rectangular shape and further includes a transceiver disposed therein for detecting a cellular phone signal. The transceiver generates a blocking signal to temporarily disable a cellular phone and thereby prevent a user from operating a cellular phone within a predetermined area. The housing further has a top surface and a bottom surface including an antenna connected thereto and for directing the blocking signal outwardly and away therefrom. The device further includes a power supply source including a rechargeable battery pack for providing power to the device and a control lever connected to the housing and operably connected to the transceiver for selectively adjusting the strength of the blocking signal as desired by a user.

12 Claims, 3 Drawing Sheets

DEVICE FOR BLOCKING CELLULAR PHONE SIGNALS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to cellular phone communications and, more particularly, to an electronic device for blocking cellular phone communications.

2. Prior Art

The proliferation of portable cellular telephones has given rise to a new cultural phenomenon, visible and audible in many social settings, and public gathering places, institutions, and the like—ringing wireless telephones and open conversations. Depending on the locale and the type of setting, this phenomenon has become an intrusion at best, and at worst, it has become very annoying to others engaging in quiet discourse, or seeking peace.

Cellular communications are provided by mobile telephones in vehicles, or by personal cellular systems (PCS) and by multiple cell networks. Several different methods exist for establishing cellular communications, with differences in frequency range, modulation, signal processing, compression, bandwidth, demodulation and signal detection, etc.

The common denominator in all of these methods and techniques is based on predetermined control frequencies, to which the cellular units are directed or "listen" automatically, while they are in the standby mode. The control is two-way full duplex, such that there are a plurality of forward control channels (FCC) from the cell to the portable unit (uplink), and a plurality of reverse control channels (RCC) from the telephone to the cell (downlink). A maximum of three channels are assigned to each cell or sector. The cellular units automatically adjust to the best of these channels available in the cell or sector.

There are two possibilities in establishing a cellular conversation:

1) The subscriber initiates a conversation (origination)—the user initiates a conversation from the cellular unit to any telephone subscriber. In this case, he dials the destination subscriber number and presses the send button, and this begins a handshake routine opposite the local cellular cell, which provides service in a given area. The call handling is then passed to an area cellular mobile telephone switch office (MTSO), which checks the information, performs a verification that the subscriber is operating properly, and is entitled to receive service and then connects to the destination subscriber. This process is known as "call setup".

2) The subscriber receives a conversation (page)—the cellular system receives a request to establish a conversation with a cellular subscriber, and the area cellular MTSO performs a subscriber locate/search activity by sending a "search call" to all the cellular cells (connected to it) and these broadcast it on their control frequencies.

The destination subscribers (when in a standby mode) which are tuned to the local control frequency, respond to the search call and this begins a handshake routine with the area cellular MTSO. When finished, the system assigns a pair of specific frequencies, a forward control channel (FCC) from the cell to the portable unit, and a reverse control channel (RCC) from the telephone to the cell, in full duplex mode, to which the telephone and cell are tuned. Only after this, a ring command is broadcast to the telephone, activating the cellular subscriber's ringing unit, and this clears the way for a full conversation.

A basic condition in establishing any cellular conversation is that the control frequency and the service in a given area are received by the subscriber with a volume that provides a required signal-to-noise ratio (S/N) or better. Clearly, this condition is also true concerning the receiver equipment at the cellular cell, that is, that the information transmitted by the subscriber is received with the required S/N ratio, or better.

Therefore, there exists a need for a device that will prevent the ability to establish a cellular telephone conversation, either received or initiated, in a given area. Various reasons exist for this requirement, and these may be security-related, cultural, moral etc. For example, prevention of a cellular conversation on military bases is a classic security requirement. The same requirement exists in a theater, as a cultural norm in some countries.

BRIEF SUMMARY OF THE INVENTION

In view of the foregoing background, it is therefore an object of the present invention to provide a device for blocking cellular phone calls. These and other objects, features, and advantages of the invention are provided by a device for blocking cellular phone signals including a housing having a substantially rectangular shape and further including a transceiver disposed therein for detecting a cellular phone signal. The transceiver generates a blocking signal to temporarily disable a cellular phone and thereby prevent a user from operating a cellular phone within a predetermined area. The housing further has a top surface and a bottom surface including an antenna connected thereto and for directing the blocking signal outwardly and away therefrom.

The device further includes a power supply source including a rechargeable battery pack for providing power to the device and a control lever connected to the housing and operably connected to the transceiver and for selectively adjusting the strength of the blocking signal as desired by a user. The power supply source is removably connectable to the housing and includes an elongated flexible cord for allowing a user to position the housing in select positions adjacent to a power outlet.

The device further includes a power control switch connected to the housing for allowing a user to toggle the device between on and off modes and a bracket being removably securable to the top surface of the housing and for mounting same to an elevated surface. The bracket includes a central portion and a pair of oppositely spaced flange portions integral therewith. The central portion has a longitudinal axis and oppositely spaced edge portions equally spaced therefrom and extending orthogonal to the flange portions and along a length of the housing. The flange portions extend upwardly and outwardly from the central portion, the flange portions including a plurality of apertures for receiving a plurality of fastening members therethrough so that the bracket can be secured to an elevated surface. The central portion further includes a plurality of apertures randomly spaced therein and for receiving a plurality of fastening members therethrough so that the bracket can be secured to the housing.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
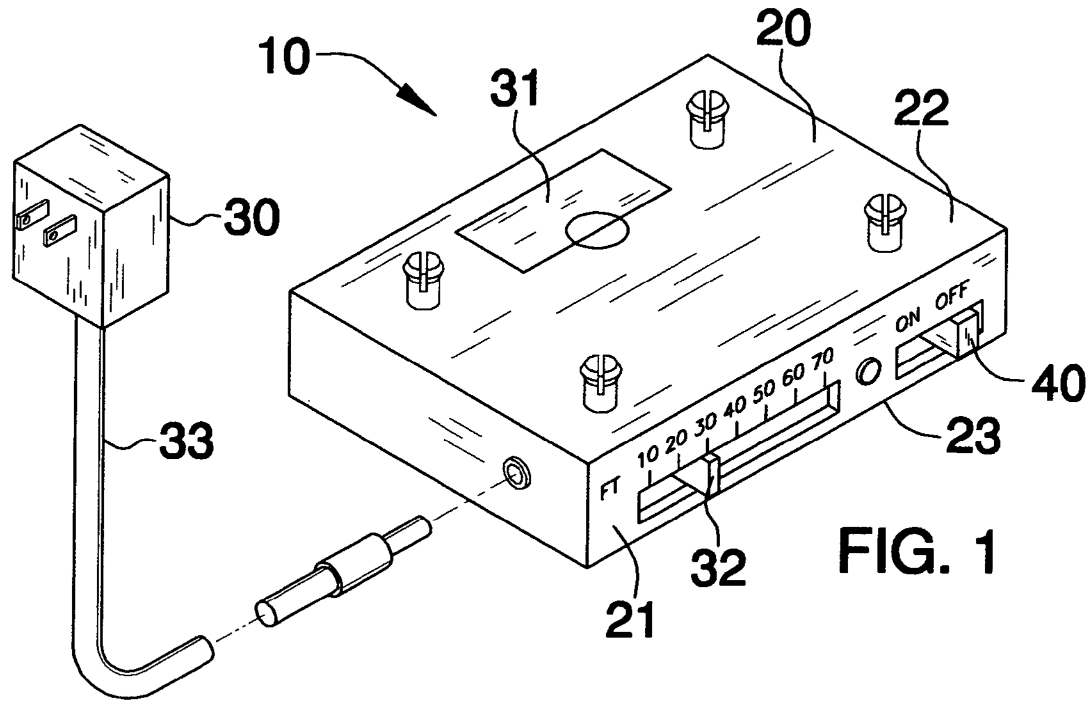
FIG. 1 is a perspective view showing the housing and power source, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1–4 by the reference numeral 10 and is intended to provide an electronic device for blocking cellular communications. It should be understood that the device 10 may be used to interfere with many different types of microwave radio transmissions and should not be limited to only cellular communications.

Figure 2:
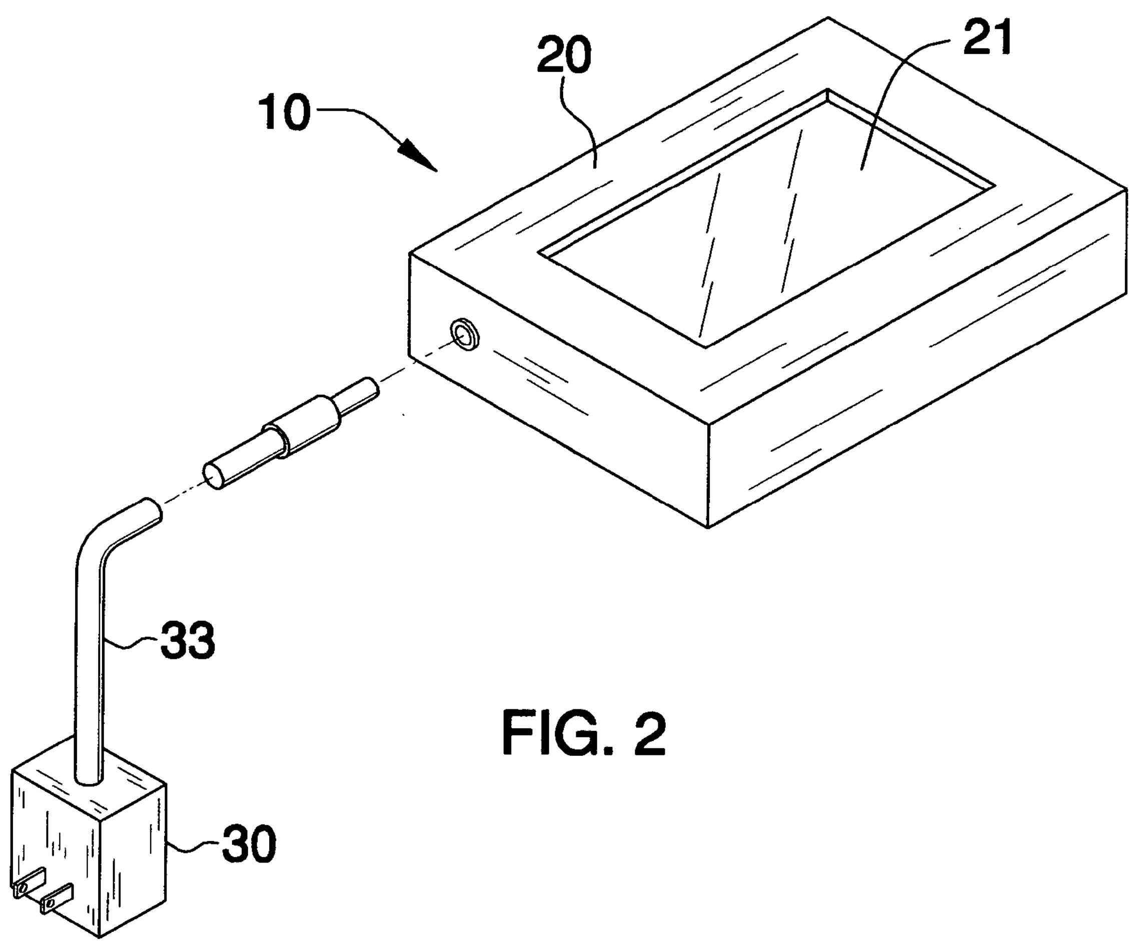
FIG. 2 is a perspective view showing the housing and power source.

Referring to FIGS. 1 and 2, the device 10 includes a housing 20 having a substantially rectangular shape and further including a transceiver 21 disposed therein for detecting a cellular phone signal. The transceiver 21 generates a blocking signal to temporarily disable a cellular phone and thereby prevent a user from operating a cellular phone within a predetermined area. The device 10 emits a sufficient amount of radio frequency energy in the cellular communication bands to obscure the signal from the nearest cellular tower site, causing a cellular phone user to get a “no signal” message when activating the cellular phone. This allows a private property owner, public facility, or military installation to selectively enforce a ban on cellular phone usage within its proximity, as perhaps best shown in FIG. 4. The housing 20 further has a top surface 22 and a bottom surface 23 including an antenna 24 connected thereto and for directing the blocking signal outwardly and away therefrom, as perhaps best shown in FIG. 3.

Still referring to FIG. 1, the device 10 further includes a power supply source 30 including a rechargeable battery pack 31 for providing power to the device 10 and a control lever 32 connected to the housing 20 and operably connected to the transceiver 21 and for selectively adjusting the strength of the blocking signal as desired by a user. The strength of the blocking signal is directly correlated to the size of the area within which the blocking signal is effective at blocking cellular communications. The power supply source 30 is removably connectable to the housing 20 and includes an elongated flexible cord 33 for allowing a user to position the housing 20 in select positions adjacent to a power outlet.

Figure 3:
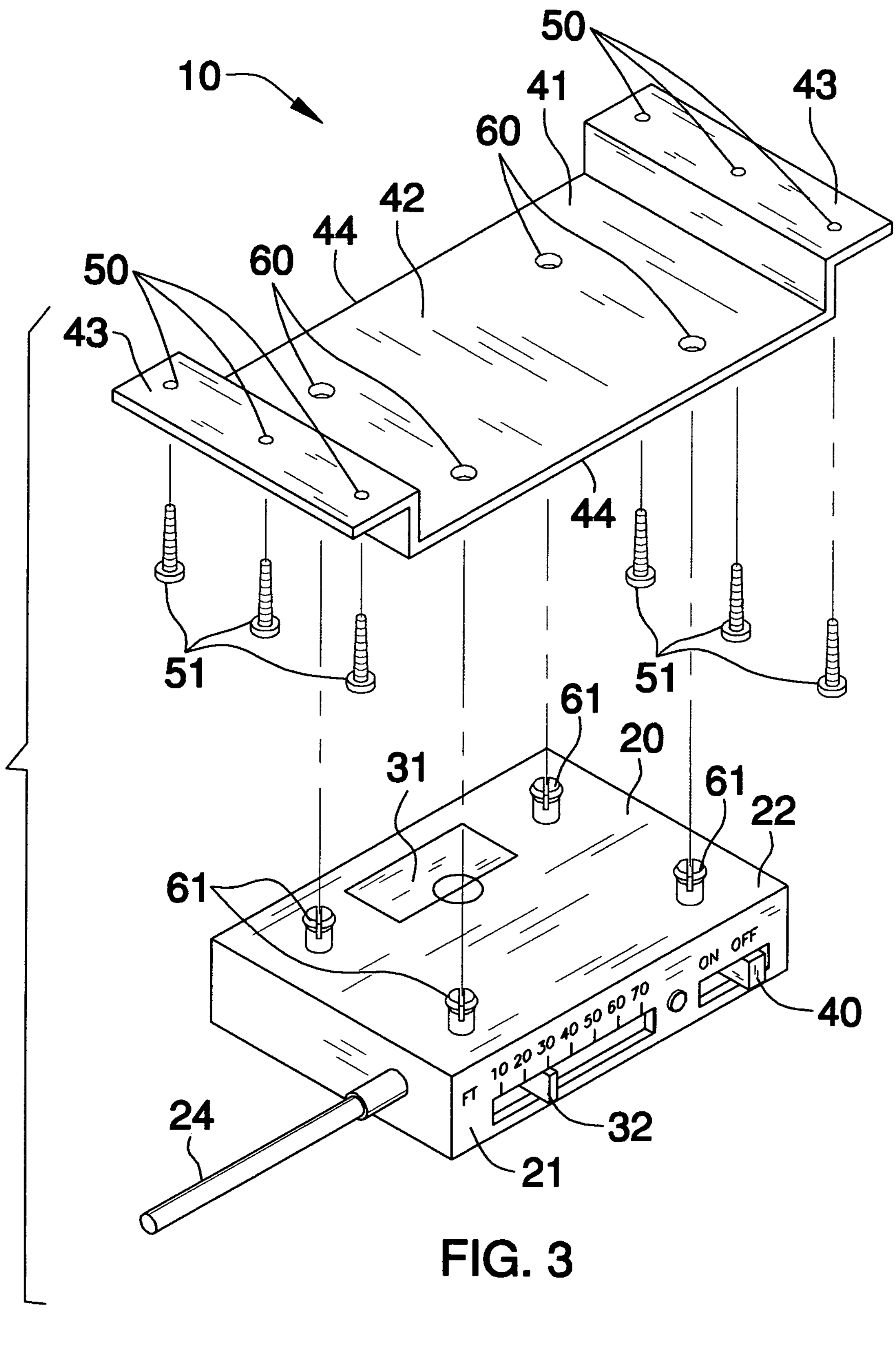
FIG. 3 is an exploded, perspective view showing the transceiver and bracket with the plurality of fastening members.
Figure 4:
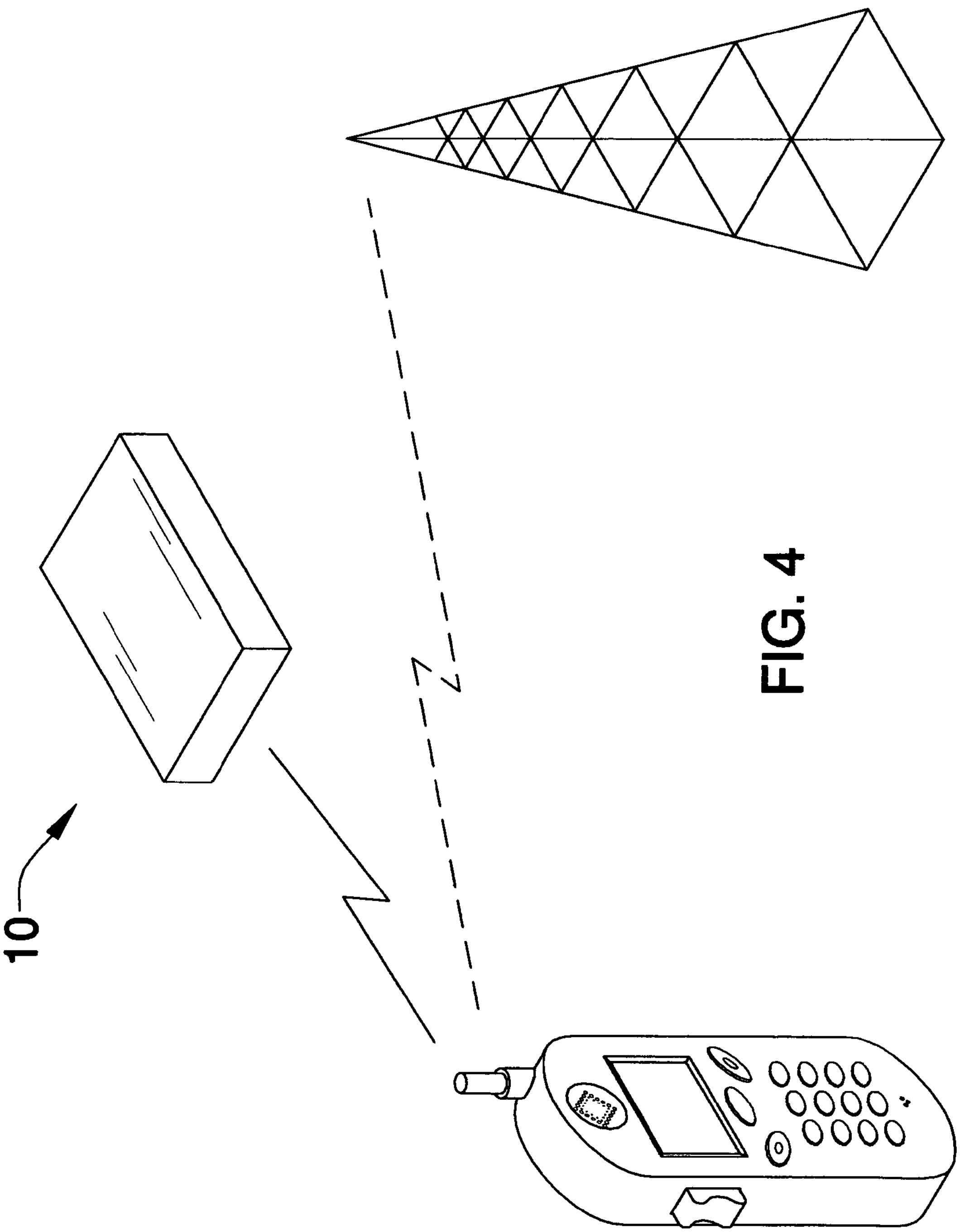
FIG. 4 is a perspective view of the apparatus of the present invention in a preferred environment.

Now referring to FIG. 3, the device 10 further includes a power control switch 40 connected to the housing 20 for allowing a user to toggle the device 10 between on and off modes and a bracket 41 removably securable to the top surface 22 of the housing 20 and for mounting same to an elevated surface. The bracket 41 includes a central portion 42 and a pair of oppositely spaced flange portions 43 integral therewith. The central portion 42 has a longitudinal axis and oppositely spaced edge portions 44 equally spaced therefrom and extending orthogonal to the flange portions 43 and along a length of the housing 20. The flange portions 43 extend upwardly and outwardly from the central portion 42 and include a plurality of apertures 50 for receiving a plurality of fastening members 60 therethrough so that the bracket 41 can be secured to an elevated surface.

The central portion 42 further includes a plurality of apertures 61 randomly spaced therein and for receiving a plurality of fastening members 51 therethrough so that the bracket 41 can be secured to the housing 20. When secured to an elevated surface, the bracket 41 provides stability, and thus, a steady stream of signals from the transceiver so that cellular communications are effectively blocked at all times while the device 10 is activated. The bracket 41 further provides a measure of security in that a casual passerby cannot simply pick up the device and walk off with it.

The adjustable and portable features of the device 10 allow it to be used to block cellular communications in areas as small as a car and as large as an office building. It is an ideal way to block cellular communications in areas such as libraries, hospitals, courthouses, churches and other high security buildings where it is essential that quiet be maintained.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A device for blocking cellular phone signals, said device comprising:

a housing having a substantially rectangular shape and including a transceiver disposed therein for detecting a cellular phone signal and generating a blocking signal to temporarily disable a cellular phone to thereby prevent a user from operating a cellular phone within a predetermined area, said housing having a bottom surface including an antenna connected thereto and for directing said blocking signal outwardly and away therefrom, said housing further having a top surface;

a power supply source for providing power to said device;

a control lever connected to said housing and operably connected to said transceiver and for selectively adjusting a strength of said blocking signal as desired by a user;

a power control switch connected to said housing for allowing a user to toggle said device between on and off modes; and a bracket being removably securable to said top surface of said housing and for mounting same to an elevated surface.

2. The device of claim 1, wherein said bracket comprises a central portion and a pair of oppositely spaced flange portions integral therewith, said central portion having a longitudinal axis and oppositely spaced edge portions equally spaced therefrom and extending orthogonal to said flange portions and along a length of said housing, said central portion including a plurality of apertures randomly spaced therein and for receiving a plurality of fastening members therethrough so that said bracket can be secured to said housing.

3. The device of claim 2, wherein said flange portions extend upwardly and outwardly from said central portion, said flange portions including a plurality of apertures for receiving a plurality of fastening members therethrough so that said bracket can be secured to an elevated surface.

4. The device of claim 1, wherein said power supply source is removably connectable to said housing and includes an elongated flexible cord for allowing a user to position said housing in select positions adjacent to a power outlet.

5. The device of claim 1, wherein said power supply source comprises a rechargeable battery pack.

6. A device for blocking cellular phone signals, said device comprising:

a housing having a substantially rectangular shape and including a transceiver disposed therein for detecting a cellular phone signal and generating a blocking signal to temporarily disable a cellular phone to thereby prevent a user from operating a cellular phone within a predetermined area, said housing having a bottom surface including an antenna connected thereto and for directing said blocking signal outwardly and away therefrom, said housing further having a top surface;

a power supply source for providing power to said device;

a control lever connected to said housing and operably connected to said transceiver and for selectively adjusting a strength of said blocking signal as desired by a user;

a power control switch connected to said housing for allowing a user to toggle said device between on and off modes; and a bracket being removably securable to said top surface of said housing and for mounting same to an elevated surface, said bracket comprising a central portion and a pair of oppositely spaced flange portions integral therewith, said central portion having a longitudinal axis and oppositely spaced edge portions equally spaced therefrom and extending orthogonal to said flange portions and along a length of said housing, said central portion including a plurality of apertures randomly spaced therein and for receiving a plurality of fastening members therethrough so that said bracket can be secured to said housing.

7. The device of claim 6, wherein said flange portions extend upwardly and outwardly from said central portion, said flange portions including a plurality of apertures for receiving a plurality of fastening members therethrough so that said bracket can be secured to an elevated surface.

8. The device of claim 6, wherein said power supply source is removably connectable to said housing and includes an elongated flexible cord for allowing a user to position said housing in select positions adjacent to a power outlet.

9. The device of claim 6, wherein said power supply source comprises a rechargeable battery pack.

10. A device for blocking cellular phone signals, said device comprising:

a housing having a substantially rectangular shape and including a transceiver disposed therein for detecting a cellular phone signal and generating a blocking signal to temporarily disable a cellular phone to thereby prevent a user from operating a cellular phone within a predetermined area, said housing having a bottom surface including an antenna connected thereto and for directing said blocking signal outwardly and away therefrom, said housing further having a top surface;

a power supply source for providing power to said device;

a control lever connected to said housing and operably connected to said transceiver and for selectively adjusting a strength of said blocking signal as desired by a user;

a power control switch connected to said housing for allowing a user to toggle said device between on and off modes; and a bracket being removably securable to said top surface of said housing and for mounting same to an elevated surface, said bracket comprising a central portion and a pair of oppositely spaced flange portions integral therewith, said central portion having a longitudinal axis and oppositely spaced edge portions equally spaced therefrom and extending orthogonal to said flange portions and along a length of said housing, said central portion including a plurality of apertures randomly spaced therein and for receiving a plurality of fastening members therethrough so that said bracket can be secured to said housing, said flange portions extending upwardly and outwardly from said central portion, said flange portions including a plurality of apertures for receiving a plurality of fastening members therethrough so that said bracket can be secured to an elevated surface.

11. The device of claim 10, wherein said power supply source is removably connectable to said housing and includes an elongated flexible cord for allowing a user to position said housing in select positions adjacent to a power outlet.

12. The device of claim 10, wherein said power supply source comprises a rechargeable battery pack.

* * * * *